(12) United States Patent
Kuhn et al.

(10) Patent No.: US 7,681,710 B2
(45) Date of Patent: Mar. 23, 2010

(54) MODULAR CONVEYER TRANSFER SYSTEMS AND METHODS

(75) Inventors: John William Kuhn, Cold Spring, KY (US); Charles Burdine, Somerset, KY (US); Barry Edwin Brown, Gainsborough (GB); James Matthew Dickman, Rising Sun, IN (US)

(73) Assignee: FKI Logistex, Inc., Mason, OH (US)

( * ) Notice: Subject to any disclaimer, the term of this patent is extended or adjusted under 35 U.S.C. 154(b) by 145 days.

(21) Appl. No.: 12/100,711

(22) Filed: Apr. 10, 2008

(65) Prior Publication Data

US 2009/0255784 A1 Oct. 15, 2009

(51) Int. Cl.
*B65G 47/46* (2006.01)
(52) U.S. Cl. .............................. 198/370.06; 198/370.1; 198/861.1
(58) Field of Classification Search ............ 198/370.01, 198/370.06, 370.09, 370.1, 861.1
See application file for complete search history.

(56) References Cited

U.S. PATENT DOCUMENTS

| | | | |
|---|---|---|---|
| 2,121,650 A | 6/1938 | Berman et al. | |
| RE22,843 E | 2/1947 | Porter | |
| 2,988,196 A | 6/1961 | Byrnes et al | |
| 3,058,567 A | 10/1962 | Brynes et al. | |
| 3,076,562 A | 2/1963 | Pitts | |
| 3,104,004 A * | 9/1963 | Poel et al. ................ | 198/370.1 |
| 3,269,519 A | 8/1966 | DeGood et al. | |
| 3,456,773 A | 7/1969 | Titmas, Jr. | |
| 3,470,998 A | 10/1969 | Zeurcher | |
| 3,565,233 A | 2/1971 | Hinman | |
| 3,608,702 A | 9/1971 | Fraioli, Sr. | |
| 3,978,975 A | 9/1976 | Herbes et al. | |
| 4,013,167 A | 3/1977 | Bourgeois | |
| 4,077,510 A | 3/1978 | Muller | |
| 4,270,656 A | 6/1981 | Chesmer et al. | |
| 4,526,266 A | 7/1985 | Dietz | |
| 4,541,520 A | 9/1985 | Greenlee, III | |
| 4,572,359 A | 2/1986 | Fujita et al. | |
| 4,589,542 A | 5/1986 | Steadman | |
| 4,589,845 A | 5/1986 | Naohara et al. | |
| 4,598,815 A | 7/1986 | Adama | |
| 4,696,386 A | 9/1987 | Lem | |

(Continued)

FOREIGN PATENT DOCUMENTS

DE 1289778 6/1969

(Continued)

OTHER PUBLICATIONS

Savoye, "Erfahrung und Performance in Bestform" Brochure, 3rd photograph on p. 2 of brochure, undated.

*Primary Examiner*—James R Bidwell
(74) *Attorney, Agent, or Firm*—Frost Brown Todd LLC (57) ABSTRACT

Modular transfer band assemblies and systems are provided. The modular transfer band assemblies may include a frame, pulleys supported by the frame, and a belt provided around the pulleys. The belt is configured to be driven to transfer an article off of a main conveyor line having rollers for conveying the article. The removable belt module is configured to be engaged and disengaged from the main conveyor line without the use of tools as a single, self-contained unit. Modular transfer band assembly systems may include the modular transfer band assembly and a support structure, wherein the modular transfer band assembly is removably attached to the support structure.

25 Claims, 11 Drawing Sheets

U.S. PATENT DOCUMENTS

| | | | |
|---|---|---|---|
| 4,703,844 A | 11/1987 | Jahns | |
| 4,730,718 A | 3/1988 | Fazio et al. | |
| 4,798,275 A | 1/1989 | Leemkuil et al. | |
| 4,880,099 A | 11/1989 | Leemkuil et al. | |
| 4,900,609 A | 2/1990 | Arnold | |
| 4,926,999 A | 5/1990 | Fauth, Sr. et al. | |
| 4,962,841 A | 10/1990 | Kloosterhouse | |
| 5,205,394 A | 4/1993 | Zeuschner | |
| 5,211,281 A | 5/1993 | Almes | |
| 5,370,384 A | 12/1994 | Romanowski | |
| 5,685,417 A | 11/1997 | Hasagawa et al. | |
| 5,743,375 A * | 4/1998 | Shyr et al. | 198/370.1 |
| 5,895,138 A | 4/1999 | Oku et al. | |
| 5,904,240 A | 5/1999 | Pax et al. | |
| 6,505,733 B2 | 1/2003 | Troupos et al. | |
| 6,561,344 B1 | 5/2003 | Basse | |
| 6,644,459 B2 * | 11/2003 | van Leeuwen et al. | 198/370.1 |
| 6,648,121 B2 | 11/2003 | Freudelsperger | |
| 6,719,125 B1 | 4/2004 | Hollander | |
| 6,866,138 B2 | 3/2005 | Hug | |
| 7,114,608 B2 | 10/2006 | Brown et al. | |
| 2002/0092734 A1 * | 7/2002 | Troupos et al. | 198/370.1 |
| 2003/0111320 A1 * | 6/2003 | van Leeuwen et al. | 198/370.06 |
| 2006/0131138 A1 | 6/2006 | Eberle et al. | |

FOREIGN PATENT DOCUMENTS

| | | |
|---|---|---|
| EP | 0407715 | 1/1991 |
| FR | 2693441 | 1/1994 |
| WO | 199116251 | 10/1991 |

* cited by examiner

MODULAR CONVEYER TRANSFER SYSTEMS AND METHODS

TECHNICAL FIELD

The present invention relates generally to conveyor transfer systems and methods, and in particular, embodiments relate to transfer systems for transferring or diverting articles off of a conveyor line to an intersecting branch, or parallel line.

BACKGROUND

Conveyor systems transport items down a primary conveying line. Often, the conveyor system will include transfer section which is used to divert, transfer, or otherwise move the items off the primary conveying line and onto branch or intersecting lines.

An example of such a transfer section is a right angle transfer unit, which is a device placed at the intersection of two perpendicular conveyor lines, to transfer an item from the main line to the intersecting conveyor line. The unit may include rollers conveying in the primary direction, and belts interspersed between the rollers which move in a direction perpendicular to the primary direction. The belts move when items are needed to be moved off of the main conveyor and onto the perpendicular conveyor.

Belts and components can wear out in such systems and require replacement. Replacement of belts and components in such systems can be difficult, time-consuming, and expensive. Moreover, such systems can require many interrelated components, all of which add to the cost of the system. Additionally, assembly and/or repair of such systems can be time-consuming and expensive, requiring use of multiple tools and the fitting of multiple components within tight spaces. In particular, repair of such systems can require multiple other components be removed to access the worn or broken component and replacement of that component, thus resulting in total system downtime. Additionally, the belts in such systems can often come off track, requiring replacement or repair.

Accordingly, it is desired to provide improvements in conveyor transfer systems and/or embodiments which address one or more of the foregoing problems.

SUMMARY

According to one embodiment, a system for transferring articles from a main conveyor line to an intersecting conveyor line is provided. The system includes at least one removable belt module comprising a frame, at least two pulleys supported by the frame, and a belt provided around the pulleys and configured to be driven to transfer an article off of a main conveyor line having rollers for conveying the article. The system further includes a support structure having mounting locations with which the removable belt module can engage. The removable belt module is configured to be removed from the support structure without the use of tools as a single, self-contained unit by disengaging the removable belt module from the mounting locations.

According to another embodiment, a modular transfer band assembly is provided. The modular transfer band assembly includes a frame, at least two pulleys supported by the frame, and a belt provided around the pulleys, the belt configured to be driven to transfer an article off of a main conveyor line having a plurality of rollers for conveying the article. The removable belt module is configured to be attached to and removed from the main conveyor line without the use of tools as a single, self-contained unit.

According to yet another embodiment of the present invention, a modular transfer band assembly is provided. The modular transfer band assembly includes a frame comprising a first side plate affixed to a second side plate, pulleys encapsulated within the frame, a belt provided around the pulleys within the frame configured to be driven to transfer an article off of a main conveyor line having a plurality of rollers for conveying the article, an engaging notch located on the first and second plates at a first end of the frame, and a locking post located between the first and second plates. A top portion of the belt is exposed in an opening of the frame such that the belt may contact the articles. The modular transfer band assembly is removably attached to a support structure comprising engaging slots and locking clips by engaging the engaging notch with an individual engaging slot and pressing the removable belt module down so that the locking clip engages the locking post. The modular transfer band assembly is removed from the support structure by pulling the removable belt module so that the locking clip disengages from the locking post and the notch disengages from the engaging slot.

BRIEF DESCRIPTION OF THE DRAWINGS

The following detailed description will be more fully understood in view of the drawings in which.

The embodiments set forth in the drawings are illustrative in nature and are not intended to be limiting of the invention defined by the claims. Moreover, individual features of the drawings and the invention will be more fully apparent and understood in view of the detailed description.

DETAILED DESCRIPTION OF ILLUSTRATIVE EMBODIMENTS

In one embodiment, a right angle transfer unit is provided as a transfer section placed at the intersection of two perpendicular conveyor lines to transfer an item from the main line to the intersecting conveyor line. The unit includes rollers conveying in the main direction, and belts interspersed between the rollers which move in a direction perpendicular to the main direction. The belts move when items are needed to be moved off of the main conveyor and onto the perpendicular conveyor. This embodiment provides improvements to assembling, locating, relocating, and replacing bands within the right angle transfer unit.

In this embodiment, the bands are provided in individual removable belt modules, and each module may be individually inserted and secured in a support structure. According to some embodiments, a locking clip retains the module in the support structure. Use of such a design allows for the ability to have one common transfer band assembly for a given configuration, ability to add, move, or remove bands easily without change to the basic configuration (and without need for tools in some embodiments) of the unit, ability to remove a band assembly in the field without a major tear down, ability to easily modify the design for custom long length applications, and/or ability to have different styles of modules (e.g., different styles of belts) which fit into the same frame (e.g., have the same mounting locations) and are easily removable and interchangeable.

The right angle transfer unit comprises a driver pulley mounted within the support structure. The driver pulley is configured to abut and contact the belt of the module and to drive the belt when transfer/diversion is desired, such that the modules need not include a driven pulley themselves, reducing their size and weight, as well as components. Moreover, the support structure can include a lifting mechanism to lift the modules when transfer is desired, such that individual modules do not need their own lifting mechanisms.

According to some embodiments, improvements are also provided to secure the right angle bands within the unit, to keep the band from jumping out, as well as to increase the contact area between the conveying surface and the carton, decrease the pulley diameters and decrease noise levels. The strap/band of these embodiments involve a pair of materials bonded to each other, the base material being a low friction material that is wider than the top and which travels along a track. The upper material being of a higher friction material used to grip and convey the cases and is more narrow than the lower material. Because the lower material is wider, it has two sides which extend from the upper material and these sides each travel below an extension track extending from the module. The track and the belt profile (with wider bottom that fits below the extension) keep the belt secure within the module.

Figure 1:
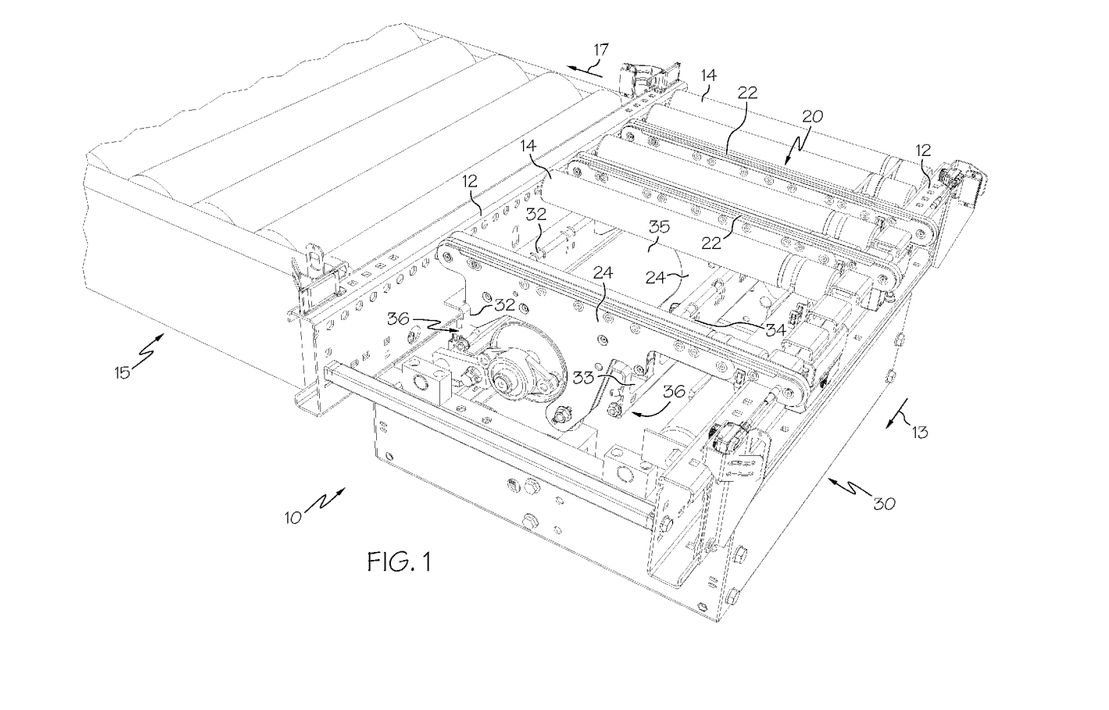
FIG. 1 is a perspective view of a right angle transfer section according to one or more embodiments of the present invention.
Figure 2A:
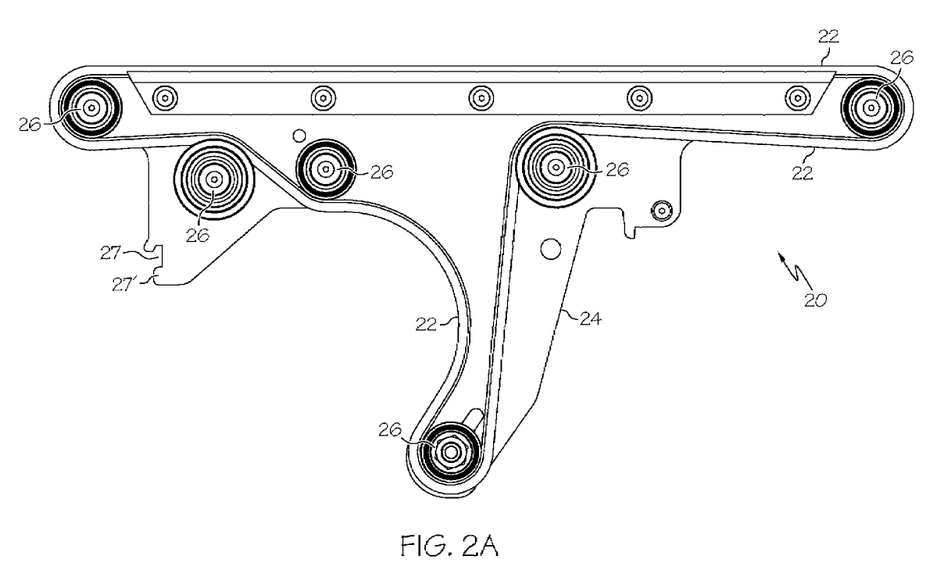
FIG. 2A is a side view of a removable belt module according to one or more embodiments of the present invention.
Figure 2B:
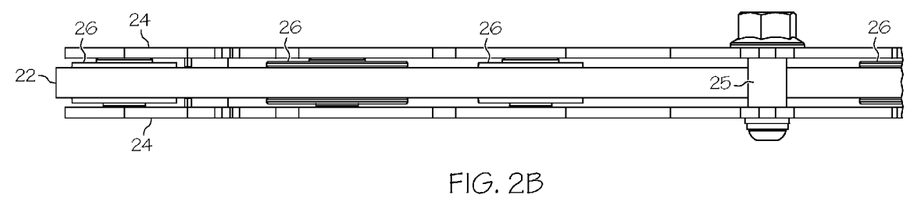
FIG. 2B is a bottom view of a portion of a removable belt module according to one or more embodiments of the present invention.
Figure 2C:
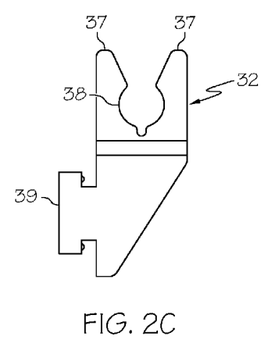
FIG. 2C is a side view of a locking clip according to one or more embodiments of the present invention.
Figure 2D:
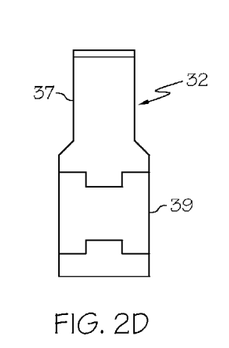
FIG. 2D is a front view of a locking clip according to one or more embodiments of the present invention.
Figure 11:
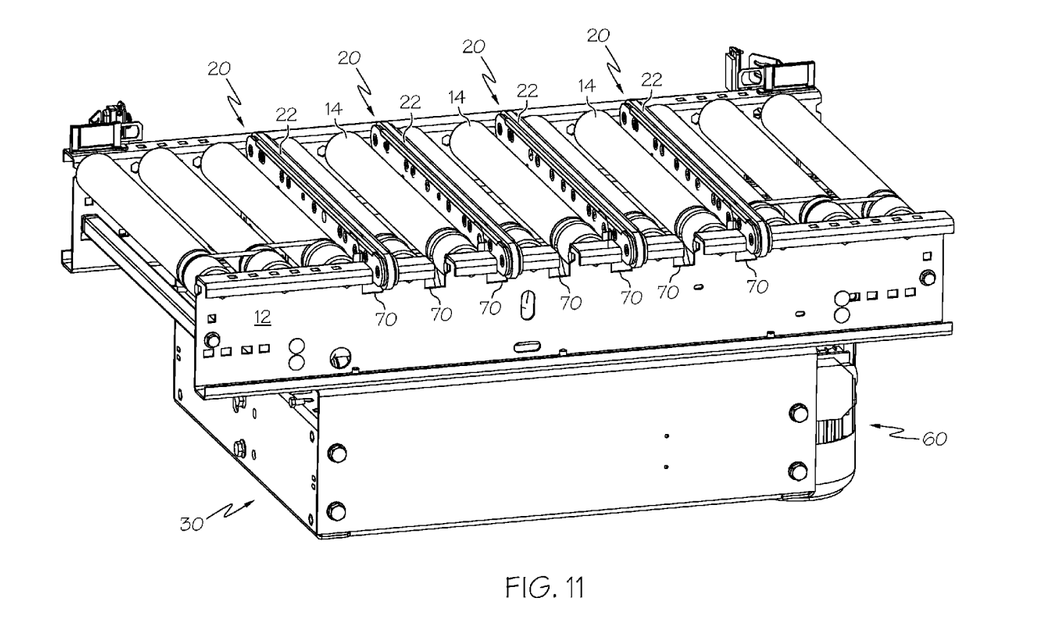
FIG. 11 is a perspective view of a plurality of removable belt modules in a system for transferring articles according to one or more embodiments of the present invention.

As shown in the embodiment of FIGS. 1-2, a right angle transfer section 10 for a conveyor system is provided. The section 10 has rails 12 that connect in line with a main conveyor system to convey articles in a primary conveyor direction 13 via the rollers 14. FIG. 1 shows some of the rollers 14 removed to reveal the removable belt modules 20, which are placed in between some of the rollers 14. (FIG. 11 depicts the configuration as assembled with all rollers 14 present). The removable belt modules 20 include belts 22 that allow items to be selectively moved off of the main conveying direction 13 and onto an intersecting conveyor 15, at right angles, to distribute the items as needed in a perpendicular direction 17, such as when items are to go to a branch conveyor and to a desired destination.

Figure 3:
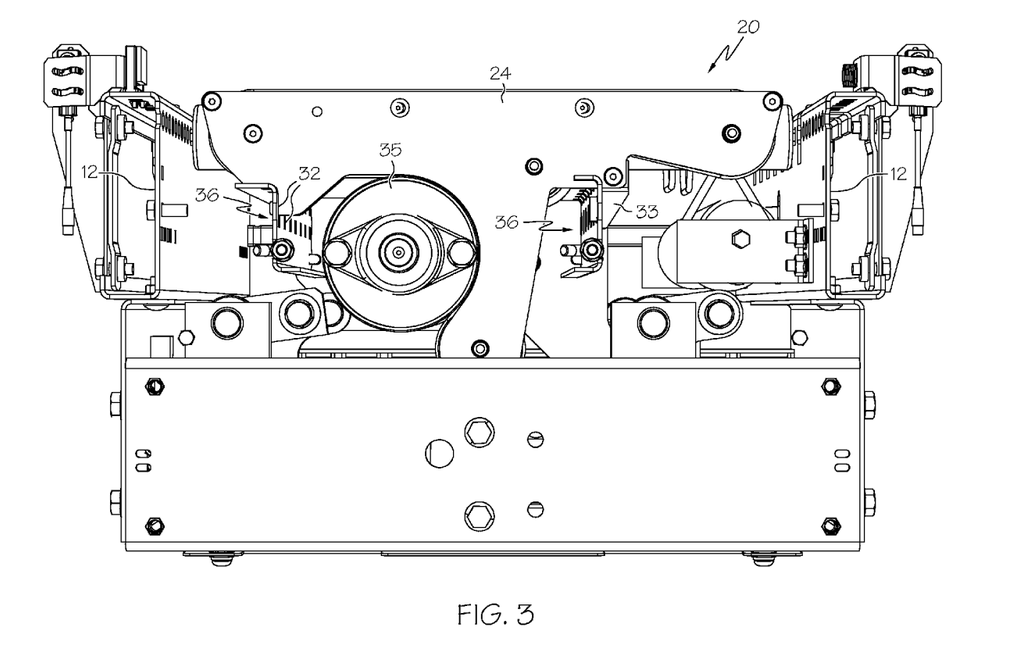
FIG. 3 is a front perspective view of a system for transferring articles according to one or more embodiments of the present invention.
Figure 6:
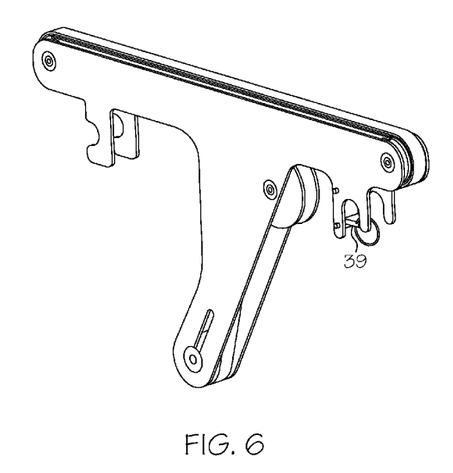
FIG. 6 is a perspective view of a removable belt module according to one or more embodiments of the present invention.

As shown in FIGS. 1-3, the removable belt modules 20 can be inserted into the system without the need for tools, bolts or the like, and are separately and easily removed from the system by hand. FIG. 3 provides a front view of a plurality of removable belt modules 20 installed in a support structure 30. The removable belt modules 20, in this embodiment, comprise a frame 24 comprising two side plates, at least two pulleys 26 supported by the frame, and a belt 22 provided around the pulleys 26 and configured to be moved to transfer an article off of a main conveyor line having rollers 14 for conveying the article (FIG. 2A). Additional pulleys 26 may also be provided as needed. The removable belt module 20 further include a first and second module mounting structure. As described herein below, the first and second module mounting structures are configured to engage first and second support structures to securely mount the removable belt module 20 in a support structure 30. According to the embodiment illustrated in FIG. 2, the second module mounting structure includes a notch 27 and an engaging structure 27'. The first module mounting structure includes a locking post 25 that is positioned within the frame 24 (FIG. 2B). Other mounting structures are also possible. For example, according to the embodiment illustrated in FIG. 6, the first module mounting structure is configured as a clip and a pin 39.

Figure 4:
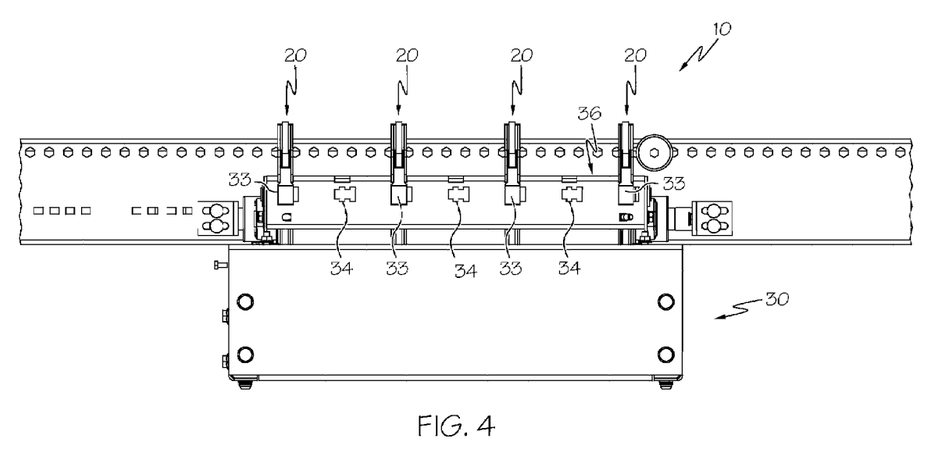
FIG. 4 is a side view of a system for transferring articles according to one or more embodiments of the present invention.
Figure 10:
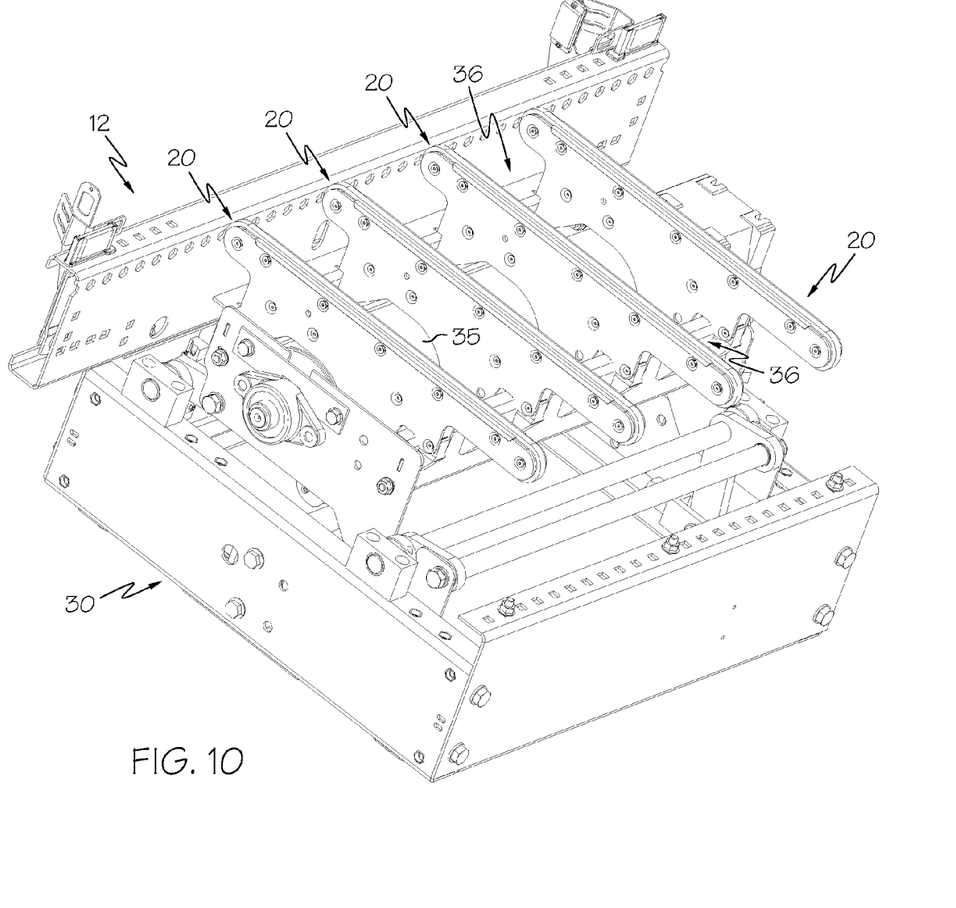
FIG. 10 is a perspective view of a plurality of removable belt modules in a system for transferring articles with rollers removed according to one or more embodiments of the present invention.

The support structure 30 has mounting locations with which the removable belt module 20 can engage. As illustrated in FIG. 1, the support structure 30 is mounted to the rails 12 of the main conveyor line. FIG. 10 depicts the support structure 30 attached to only one rail 12 to provide a clear view of how the support structure 30 may be mounted. The mounting locations include a first mounting support structure 33 and a second mounting support structure 32. According to the embodiment illustrated in 1-5, the second mounting support structure comprises a several vertical recesses 32 located at the mounting locations. The first support mounting structure includes a locking clip 33 that is positioned within locking clip recesses 34 in the support structure 30 (FIG. 4). The first and second support mounting structures are located along two mounting rails 36 within the support structure 30.

Mounting of the removable belt module 20 into the support structure 30 may be effectuated by placing a notch 27 of the removable belt module 20 onto the rail 36 and the engaging structure 27' into one of the vertical recesses 32 at a mounting location of the mounting rail 36. The removable belt module 20 is locked into place by aligning the locking post 25 (FIG. 2B) of the removable belt module 20 with the locking clip 33 (FIGS. 2C and 2D) and pressing down on the removable belt module 20 so that the locking post 25 snaps into the locking clip 33. The removable belt module 20 may be removed from the support structure 30 by pulling up on the removable belt module 20 to disengage the locking post 25 from the locking clip 33, and pulling the removable belt module 20 to remove the engaging structure 27' from the recess 32.

Figure 5:
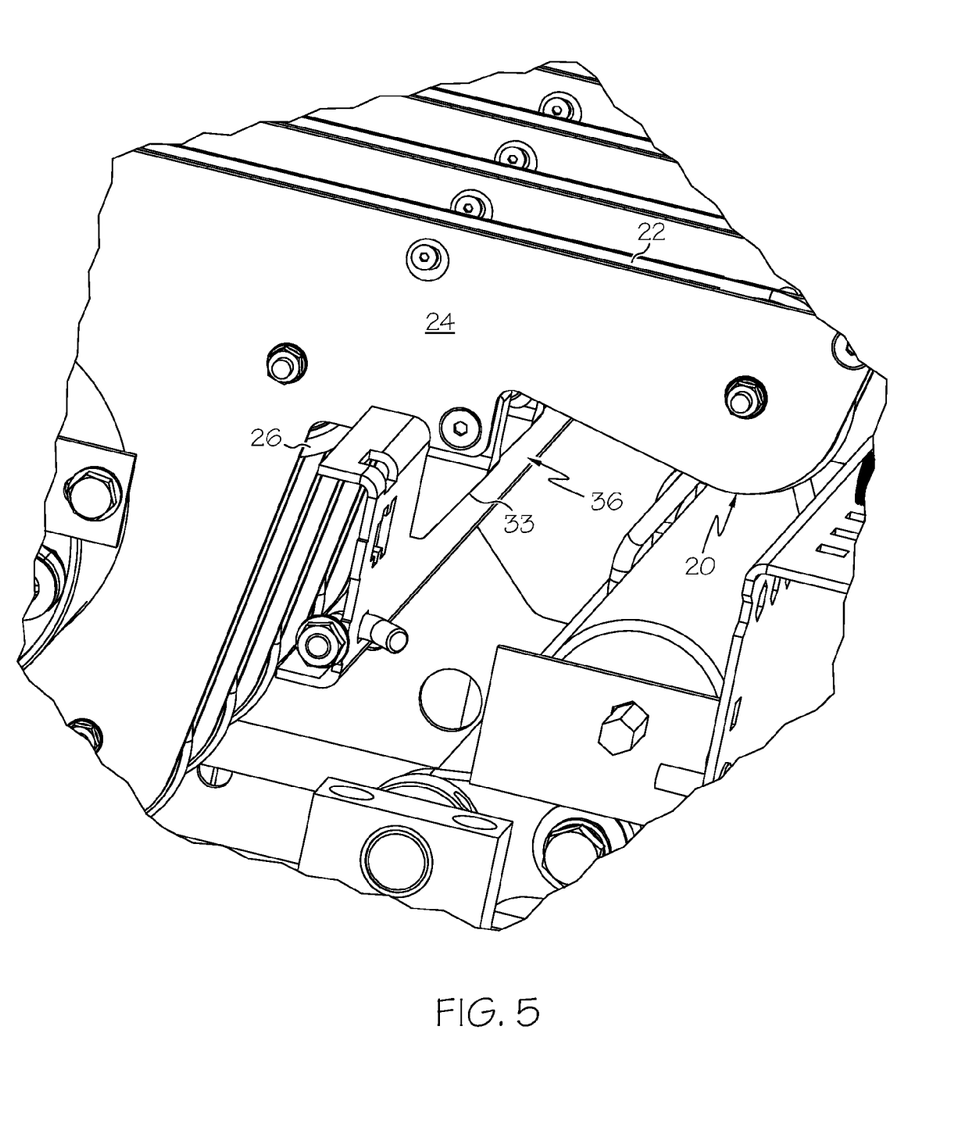
FIG. 5 is a perspective view of a removable belt module engaged in a support structure according to one or more embodiments of the present invention.

FIG. 5 provides a close-up view of the engagement of the locking post 25 (not shown in FIG. 5) and the locking clip 33, as well as the mounting of the removable belt module 20 into the support structure 30. Thus, via the snap fitting of this embodiment, the removable belt module 20 is configured to be engaged and disengaged from the mounting locations by hand and removed as a single, self-contained unit with the belt 22 from the support structure 30, without requiring tools. The belt 22 need not be removed to remove the belt modules 20. Therefore, the removable belt module 20 may be easily removed and repaired and or replaced, or the system easily customized to include the number of desired removable belt modules 20, with little effort. Manufacturing and repair time is greatly decreased with respect to this embodiment, allowing for substantial operational cost savings. Also, various removable belt module types (e.g., a captured flat band or a round band) may be incorporated as desired for the application, in some embodiments. The removable belt modules may be made to have the same mounting locations, but different belt types, lengths, sizes, etc. Accordingly, these embodiments allow for easily interchanging one module type with another and providing an easily customizable system.

The locking clip 33 may be made of any flexible material such as plastic and may be of any configuration to enable the clip 33 to engage the locking post 25. According to the locking clip 33 illustrated in FIG. 2C, the locking clip 33 may comprise two tabs 41 that are shaped to form an opening 38 that accepts the locking post 25. The tabs 41 may also be angled to assist in guiding the locking post 25 into the opening 38. The locking clip 33 may also be constructed so that it is easily removable from the mounting rail 36 when a belt module 20 is removed from a mounting location and no subsequent belt module 20 will be inserted at that particular mounting location. In the embodiment shown in FIG. 4, the transfer section 10 has three removable belt modules 20 mounted in the support structure 30. Only in the mounting locations where a removable belt module is present is a locking clip 33 provided. The locking clip 33 can include a mounting tab 39 (FIGS. 2C and 2D) that comprises a pattern designed to be engaged in a similarly shaped recess 34 (FIG. 4) such that the tab 39 may be aligned with the pattern of the recess 34, and then moved over into a secured position. Other configurations are also possible.

Figure 7:
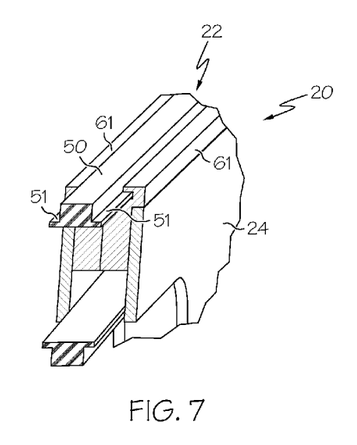
FIG. 7 is a perspective view of a captured flat band according to one or more embodiments of the present invention.
Figure 8:
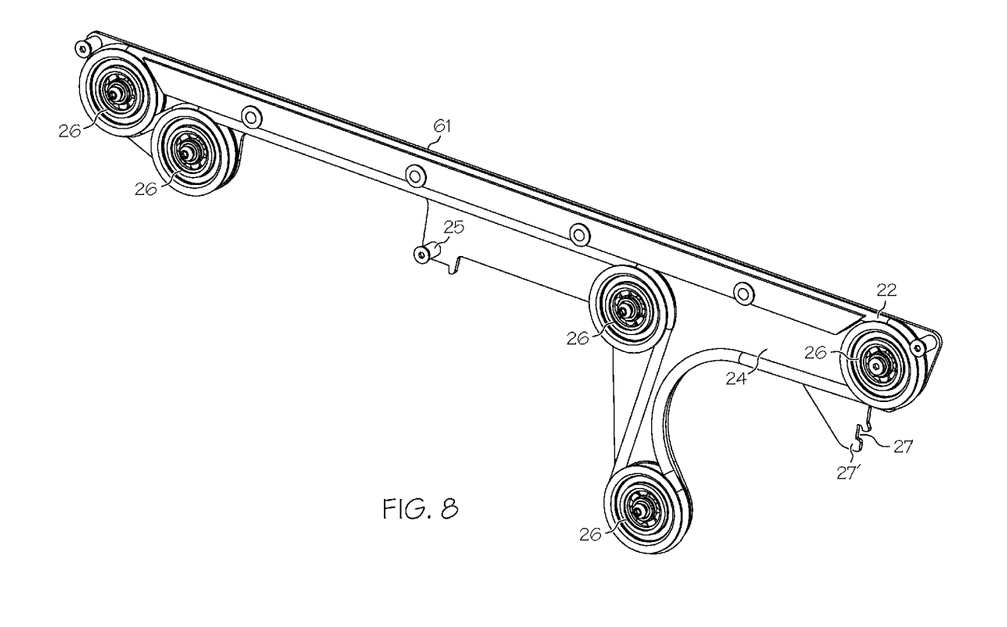
FIG. 8 is a cross sectional view of a removable belt module according to one or more embodiments of the present invention.

As shown in FIG. 7, in some embodiments the belt 22 may comprise a captured flat band having an upper portion 50 bound to a lower portion 52. The upper portion 50 is configured to contact the articles and lower portion 52 includes side portions 51 extending wider than the upper portion. The removable belt module 20 includes a pair of extensions 61 extending inwardly from the frame 24 and over the side portions 51 of the belt. The extensions 61 may be incorporated into the side plates of the frame 24, or may be made of a low friction material that is affixed to the frame 24, such as ultra-high molecular weight polymers. Thus, the extensions 61 are configured to restrict lateral movement of the belt, in this embodiment. The lower portion 52 may be made of a material having a low coefficient of friction, such as belting material to allow the captured belt to easily slide underneath the extensions 61. The upper portion 50 may comprise a material having a higher coefficient of friction, such as urethane rubber so that the belt 22 is able to better engage the article and transfer it to a perpendicular conveyor line. Other belt 22 configurations are also possible, such as the round band 22 shown in the embodiment illustrated in FIG. 8. Similar to the captured flat band, the round band may retained by extensions 61.

Figure 9:
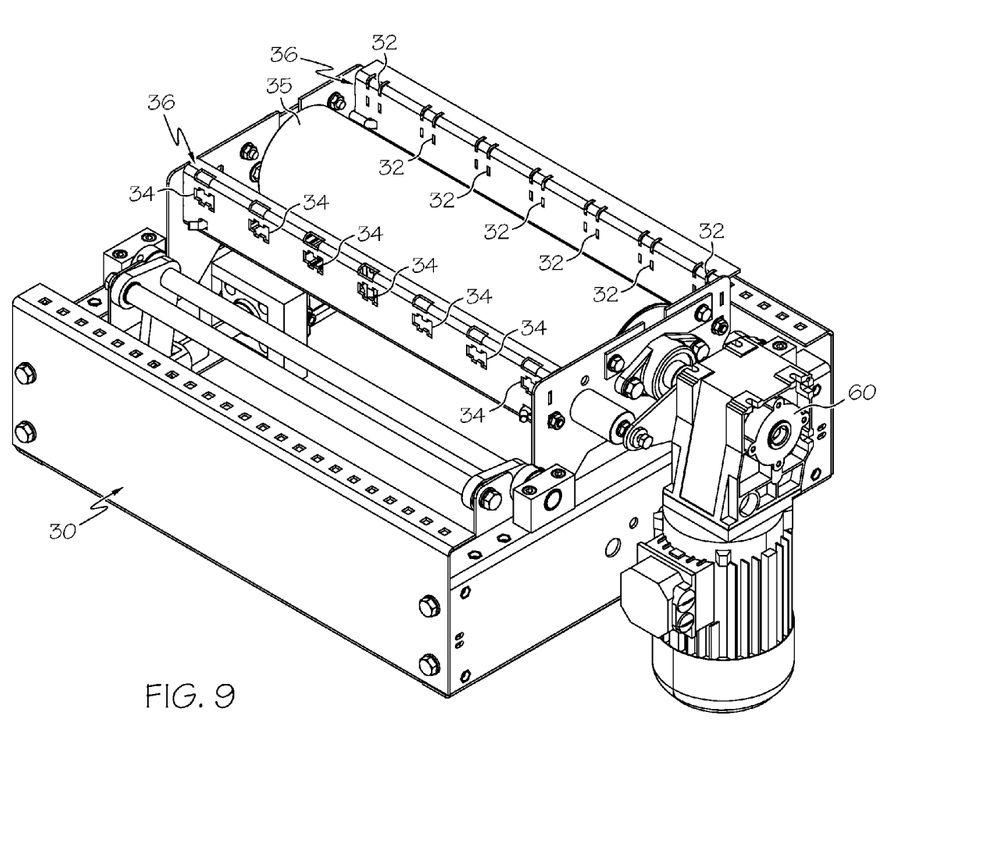
FIG. 9 is a perspective view of a support structure assembly according to one or more embodiments of the present invention.

Also provided within the support structure 30 is a driving pulley or cylindrical roller 35 configured to contact and drive the belt 22 when the removable belt module 20 is engaged with the support structure 30, as shown in FIG. 9. The frame 24 of the removable belt module 20 is configured such that the removable belt module 20 conforms to the shape of the driving pulley 35. The driving pulley 35 drives the belts 22 of each removable belt module 20 without requiring a separate motor, gearbox, timing belt pulleys, timing belt and tensioning means. The driving pulley 35 is electrically driven by a brushless motor, for example, and rotates to drive the belts 22 when an article is to be transferred from the main conveyor line to a perpendicular or intersecting conveyor line. Additionally, the support structure 30 may comprise a lift actuator 60 configured to raise the removable belt modules 20 above the rollers 14 of the main conveyor line to transfer an article off of the main conveyor line. The lift actuator 60 may be electromechanically or pneumatically driven. A controls package or method of control is employed to activate the transfer cycle. The transfer may be activated through a series of lifting or torsion bars, or by other means. Electrical and pneumatic actuators may be interchangeable at the time of build or after installation. Actuators 60 are utilized to raise and lower the transfer based on functional requirements of the system.

The right angle transfer section 10 or system is easily configured and reconfigured, with removable belt modules 20 easily added or subtracted. For example, any number of removable belt modules 20 may be provided, with custom section 10 lengths up to any desired length. Additionally, removable belt modules 20 may be staggered such that the number of rollers 14 between each removable belt module 20 is increased. The section 10 may come in a variety of configurations to meet the needs of a customer. For example, the removable belt modules 20 may be confined within the side rails 12 of the main conveyor line, as illustrated in FIG. 1. Referring to FIG. 11, the removable belt modules 20 may extend beyond one or both rails 12 of the main conveyor line. In such embodiments, the rails 12 may be notched 70 to accommodate the extending removable belt modules 20.

The foregoing description of the various embodiments of the invention has been presented for the purposes of illustration and description. It is not intended to be exhaustive or to limit the invention to the precise steps and/or forms disclosed. Many alternatives, modifications and variations will be apparent to those skilled in the art of the above teaching. Moreover, although multiple inventive aspects have been presented, such aspects need not be utilized in combination, and various combinations of inventive aspects are possible in light of the various embodiments provided above. Accordingly, the above description is intended to embrace all possible alternatives, modifications, combinations, and variations that have been discussed or suggested herein, as well as all others that fall with the principles, spirit and broad scope of the inventions as defined by the claims.

What is claimed is:

1. A system for transferring articles from a main conveyor line to an intersecting conveyor line, the system comprising:
   at least one removable belt module comprising a frame, at least two pulleys supported by the frame, and a belt provided around the pulleys and configured to be driven to transfer an article off of a main conveyor line having a plurality of rollers for conveying the article; and
   a support structure having at least one mounting location with which the removable belt module can engage, wherein the removable belt module is configured to be removed from the support structure without the use of tools as a single, self-contained unit by disengaging the removable belt module from the at least one mounting location.

2. The system as recited in claim 1, wherein the at least one removable belt module is configured to be disengaged from the mounting locations without requiring removal of any of the rollers or any other belt.

3. The system as recited in claim 1, wherein the removable belt module is confined within the support structure and is positioned between a plurality of rollers that convey the article in a primary direction.

4. The system as recited in claim 1, wherein the removable belt module extends through one or more rails of the main conveyor line.

5. The system as recited in claim 1, wherein the support structure comprises a driving pulley configured to contact and drive the belt when the removable belt module is engaged within the support structure.

6. The system as recited in claim 5, wherein:
the support structure further comprises a motor configured to rotate the driving pulley and thereby drive the belt of the removable belt module.

7. The system as recited in claim 6, wherein the motor comprises a brushless motor.

8. The system as recited in claim 1, wherein the support structure comprises a lift actuator configured to raise the removable belt module above the rollers of the main conveyor line to engage and transfer an article off of the main conveyor line.

9. The system as recited in claim 8, wherein the lift actuator is further configured to electro-mechanically raise the removable belt module above the main conveyor.

10. The system as recited in claim 8, wherein the lift actuator is configured to pneumatically raise the removable belt module above the main conveyor.

11. The system as recited in claim 1, wherein:
the support structure comprises a driving pulley configured to contact and drive the belt;
the support structure comprises a lift actuator configured to raise the removable belt module above the rollers of the main conveyor line; and
the system is configured to raise the removable belt module and rotate the driving pulley when the article is to be transferred off of the main conveyor line to the intersecting conveyor line.

12. The system as recited in claim 1, wherein:
the removable belt module comprises a first module mounting structure and a second module mounting structure;
the support structure comprises at least one first support mounting structure positioned along a first side of the support structure, and at least one second mounting structure positioned along a second side of the support structure; and
the first module mounting structure and the first support mounting structure are configured to engage, and the second module mounting structure and the second support mounting structure are configured to engage, thereby removably retaining the removable belt module to the support structure.

13. The system as recited in claim 12, wherein:
at least one of the first module mounting structure and the first support mounting structure comprise a recess, and at least one of the first module mounting structure and the first support mounting structure comprise an engaging structure configured to fit within the recess; and
at least one of the second module mounting structure and the second support mounting structure comprise a recess, and at least one of the second module mounting structure and the second support mounting structure comprise an engaging structure configured to fit within the recess.

14. The system as recited in claim 12 wherein the first module mounting structure comprises a recess and the first support mounting structure comprises a support shaft, wherein the recess is configured to rest upon the support shaft and to be held to the support shaft by at least one of a clip and a pin.

15. The system as recited in claim 12, wherein:
the first module mounting structure comprises a locking post; and
the first support mounting structure comprises a locking clip configured to removably fasten to the locking post such that the removable belt module is retained to the support structure by pressing the removable belt module down so that the locking clip engages the locking post, and the removable belt module is removed from the support structure by pulling the removable belt module so that the locking clip disengages from the locking post.

16. The system as recited in claim 1, wherein:
the removable belt module comprises an engaging notch located on a first end of the removable belt module, and a locking post located on a second end of the removable belt module;
the support structure comprises a plurality of engaging slots located along a first side of the support structure and a plurality of locking clips located along a second side of the support structure;
the engaging slots are configured to accept the engaging notches; and
the locking clips are configured to removably fasten to the locking post such that the removable belt module is retained to the support structure by pressing the removable belt module down so that the locking clip engages the locking post, and the removable belt module is removed from the support structure by pulling the removable belt module so that the locking clip disengages from the locking post.

17. The system as recited in claim 1, wherein the belt comprises a round band profile.

18. The system as recited in claim 1, wherein:
the belt comprises an upper portion configured to contact the articles and a lower portion having side portions extending wider than the upper portion and a height shorter than the upper portion;
the removable belt module comprises a pair of extensions extending inwardly from the frame and forming an extension track over the side portions of the belt; and
the extension track restricts lateral movement of the belt.

19. The system as recited in claim 18, wherein:
the lower portion comprises an low friction lower material to enable the belt to slide under the extensions; and
the upper portion comprises a high friction upper material to grip the article for transfer off of the main conveyor line.

20. The system as recited in claim 1, wherein the support structure is configured to accept any number of removable belt modules.

21. The system as recited in claim 1, wherein removable belt modules may be added or removed from the support structure without the use of tools.

22. The system as recited in claim 1, wherein the support structure is attached underneath the main conveyor at an intersection between the main conveyor line and the intersecting conveyor line.

23. The system as recited in claim 1, wherein the support structure further comprises a frame piece and a plurality of rollers, the support structure positioned at an intersection between the main conveyor line and the intersecting conveyor line.

24. A modular transfer band assembly comprising a frame, at least two pulleys supported by the frame, and a belt provided around the pulleys, wherein the belt is configured to be driven to transfer an article off of a main conveyor line having a plurality of rollers for conveying the article and the removable belt module is configured to be engaged and disengaged from the main conveyor line without the use of tools as a single, self-contained unit.

25. A modular transfer band assembly comprising:
- a frame comprising a first side plate affixed to a second side plate forming an opening along a top surface of the frame;
- at least two pulleys encapsulated within the frame;
- a belt provided around the pulleys within the frame configured to be driven to transfer an article off of a main conveyor line having a plurality of rollers for conveying the article, wherein a top portion of the belt is exposed in the opening such that the belt may contact the articles;
- an engaging notch located on the first and second side plates at a first end of the frame; and
- a locking post located between the first and second plates at a second end of the frame;

wherein:
- the modular transfer band assembly is removably attached to a support structure comprising a plurality of engaging slots and a plurality of locking clips by engaging the engaging notch with an individual engaging slot and pressing the removable belt module down so that the locking clip engages the locking post; and
- the modular transfer band assembly is removed from the support structure by pulling the removable belt module so that the locking post disengages from the locking clip and the notch disengages from the engaging slot.

* * * * *